US011987362B2

(12) United States Patent
Mills

(10) Patent No.: US 11,987,362 B2
(45) Date of Patent: May 21, 2024

(54) GALLEY CART SECURING SYSTEMS AND METHODS

(71) Applicant: THE BOEING COMPANY, Chicago, IL (US)

(72) Inventor: Christopher J. Mills, Charleston, SC (US)

(73) Assignee: The Boeing Company, Chicago, IL (US)

(*) Notice: Subject to any disclaimer, the term of this patent is extended or adjusted under 35 U.S.C. 154(b) by 121 days.

(21) Appl. No.: 17/813,119

(22) Filed: Jul. 18, 2022

(65) Prior Publication Data
US 2024/0017830 A1    Jan. 18, 2024

(51) Int. Cl.
B64D 11/04 (2006.01)
F16F 7/00 (2006.01)

(52) U.S. Cl.
CPC ............... B64D 11/04 (2013.01); F16F 7/00 (2013.01)

(58) Field of Classification Search
CPC ........ B64D 11/04; F16F 7/00; B62B 2202/67; B62B 2301/0465
See application file for complete search history.

(56) References Cited

U.S. PATENT DOCUMENTS

| | | | | |
|---|---|---|---|---|
| 3,618,884 A * | 11/1971 | Wilson | ............... | B64D 11/04 248/501 |
| 5,960,615 A * | 10/1999 | Meetze | ............... | A01D 34/001 16/35 R |
| 6,007,025 A * | 12/1999 | Coughren | ............... | B64D 11/02 244/118.6 |
| 9,359,078 B2 * | 6/2016 | Burd | ............... | B64D 11/0015 |
| 10,029,795 B2 * | 7/2018 | Burd | ............... | B64D 11/0007 |
| 10,752,053 B2 * | 8/2020 | Ursescu | ............... | B60B 33/0026 |
| 10,807,696 B2 * | 10/2020 | Singleton | ............... | E06C 1/005 |
| 11,858,612 B2 * | 1/2024 | Singleton | ............... | E06C 1/005 |
| 11,865,383 B2 * | 1/2024 | Muin | ............... | A62C 3/08 |
| 2004/0265084 A1 * | 12/2004 | Hillberry | ............... | A61G 5/04 410/66 |
| 2005/0133308 A1 * | 6/2005 | Reysa | ............... | B64D 11/04 186/40 |
| 2013/0256249 A1 * | 10/2013 | Burd | ............... | B64D 11/0015 211/153 |
| 2013/0256479 A1 * | 10/2013 | Forbes | ............... | B64D 11/04 248/205.1 |

(Continued)

FOREIGN PATENT DOCUMENTS

CN          208006998          10/2018

OTHER PUBLICATIONS

Extended European Search Report for EP App. No. 23171002.1-1004, dated Nov. 28, 2023.

Primary Examiner — Medhat Badawi
(74) Attorney, Agent, or Firm — Joseph M. Butscher; The Small Patent Law Group LLC

(57) ABSTRACT

A system and a method for securing and stabilizing one or more galley carts within a stowage compartment within an internal cabin of a vehicle include one or more dampers configured to be secured to one or more surfaces of the stowage compartment. The one or more dampers are configured to exert a spring force into the one or more galley carts to stabilize the one or more galley carts between the one or more dampers and one or more other surfaces of the stowage compartment.

17 Claims, 6 Drawing Sheets

(56) References Cited

U.S. PATENT DOCUMENTS

| | | | | |
|---|---|---|---|---|
| 2013/0306794 | A1* | 11/2013 | Zahlen | B64C 1/068 |
| | | | | 244/118.5 |
| 2014/0352929 | A1* | 12/2014 | Wu | F25D 3/125 |
| | | | | 165/104.34 |
| 2015/0059363 | A1* | 3/2015 | Burd | B62B 5/0447 |
| | | | | 62/3.62 |
| 2015/0321761 | A1* | 11/2015 | Young | B62B 5/049 |
| | | | | 280/47.34 |
| 2016/0258188 | A1* | 9/2016 | Vandewall | E05C 1/10 |
| 2016/0264242 | A1* | 9/2016 | Burd | B64D 11/04 |
| 2016/0290023 | A1* | 10/2016 | Boivin | B62B 5/0433 |
| 2017/0023027 | A1* | 1/2017 | Claflin | B64D 11/003 |
| 2018/0118325 | A1* | 5/2018 | Singleton | E06C 1/005 |
| 2019/0023070 | A1* | 1/2019 | Ursescu | B60B 33/0005 |
| 2020/0115057 | A1* | 4/2020 | Chylinski | B64D 11/04 |
| 2020/0339262 | A1* | 10/2020 | Claflin | B62B 5/0083 |
| 2021/0155347 | A1* | 5/2021 | Burd | B64D 11/04 |
| 2022/0105975 | A1* | 4/2022 | Dowty | B62B 3/003 |
| 2022/0234741 | A1* | 7/2022 | Agadi | B64D 11/04 |
| 2023/0341025 | A1* | 10/2023 | Ohashi | B25J 19/0016 |
| 2023/0356442 | A1* | 11/2023 | Nagai | B29C 44/36 |
| 2024/0002055 | A1* | 1/2024 | Smakman | B64D 11/04 |
| 2024/0002056 | A1* | 1/2024 | Holtorf | B64D 11/04 |

\* cited by examiner

GALLEY CART SECURING SYSTEMS AND METHODS

FIELD OF THE DISCLOSURE

Examples of the present disclosure generally relate to systems and methods for securing and stabilizing galley carts within a stowage compartment of a vehicle, such as a commercial aircraft.

BACKGROUND OF THE DISCLOSURE

Various types of aircraft are used to transport passengers and cargo between various locations. Commercial aircraft often include one or more galleys. Galley carts are moved in and out of the galleys. The galley carts are configured to contain food, beverages, and optionally trash. Galley carts are stored in galleys but can also be stored in other appropriately provisioned aircraft monuments, such as closets and entrance enclosures for overhead crew rests.

Galley carts are retained within stowage compartments, which are typically larger than the galley carts to allow for variations in galley cart dimensions, and ease of maneuvering the galley carts into and out of the compartments. The compartments typically include durable wear surfaces to prevent damage to the galley carts and surfaces of the compartments. The wear surfaces are generally made of materials that are durable, and easily cleanable. As such, the wear surfaces are typically made of hard materials such as nylon or other similar plastics.

The combination of extra space between galley carts and wear surfaces, and aircraft vibrations and movements during flight, can result in the generation of noise that may be unappealing and/or higher than certain regulatory requirements permit. Most areas of a commercial aircraft have noise targets for general passenger cabins, and also for areas of the aircraft configured to provide a restful environment, such as crew rest areas. Crew rest areas typically meet noise level requirements in general, and in particular noise events that are intrusive and higher than required ambient noise levels. Crew rest areas that include galley cart stowage areas that can generate noise as described above can result in non-conformance with certain regulations regarding noise, such as promulgated by the United States Federal Aviation Administration (FAA).

SUMMARY OF THE DISCLOSURE

A need exists for a system and a method for securing a galley cart within a compartment within an internal cabin of a vehicle. Further, a need exists for a system and a method for eliminating, minimizing, or reducing a potential of noise generated by a galley cart within a compartment.

With those needs in mind, certain examples of the present disclosure provide a system for securing and stabilizing one or more galley carts within a stowage compartment within an internal cabin of a vehicle. The system includes one or more dampers configured to be secured to one or more surfaces of the stowage compartment. The one or more dampers are configured to exert a spring force into the one or more galley carts to stabilize the one or more galley carts between the one or more dampers and one or more other surfaces of the stowage compartment.

In at least one example, the one or more dampers are secured to a central divider configured to be secured to a top wall of the stowage compartment. For example, the one or more dampers include a first damper on a first side of the central divider, and a second damper on a second side of the central divider. As a further example, the one or more dampers include a first set of three dampers on a first side of the central divider, and a second set of three dampers on a second side of the central divider.

In at least one example, the one or more dampers include a leading contact member, a spring beam coupled to the leading contact member, and a trailing contact pad coupled to the spring beam.

In at least one example, the leading contact member includes a blunted nose configured to automatically guide the one or more galley carts into the stowage compartment.

In at least one example, the spring beam includes a flat deflectable main body. The spring beam can be formed of stainless steel. In at least one example, the spring beam includes a front portion secured to the leading contact member, an exposed intermediate portion rearwardly extending from the front portion, and a rear end secured to the trailing contact pad.

In at least one example, the trailing contact pad includes a rearwardly angled front face, and a rounded lateral contact surface rearwardly extending from the rearwardly angled front face.

Certain examples of the present disclosure provide a method for securing and stabilizing one or more galley carts within a stowage compartment within an internal cabin of a vehicle. The method includes securing one or more dampers to one or more surfaces of the stowage compartment, wherein the one or more dampers are configured to exert a spring force into the one or more galley carts to stabilize the one or more galley carts between the one or more dampers and one or more other surfaces of the stowage compartment.

Certain examples of the present disclosure provide a vehicle including an internal cabin. A stowage compartment is within the internal cabin. The stowage compartment is configured to retain one or more galley carts. The vehicle also includes system for securing and stabilizing the one or more galley carts within the stowage compartment, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods for securing a galley cart within a compartment, such as within an internal cabin of a vehicle. The systems and methods eliminate, minimize, or otherwise reduce potential noise generated by the galley cart within the compartment.

In at least one example, a system includes a flat spring with nylon contact features to hold a galley cart in place relative to a stowage compartment, such as during a flight of an aircraft. The system is passive in that it does not add any steps to flight attendant procedures. The system is also easily cleanable, thereby satisfying United States Food and Drug Administration (FDA) requirements for cleanability. Further, the system is durable (for example, a flat spring), and does not impede the insertion or removal of a galley cart from the stowage compartment.

As described herein, the systems and methods reduce rattling or other such noise generated by galley carts through application of a preload, thereby keeping carts pressed on side bumpers during normal flight conditions. The galley carts may only contact nylon surfaces. The systems and methods do not significantly increase cart pull/push forces by operator.

Figure 1:
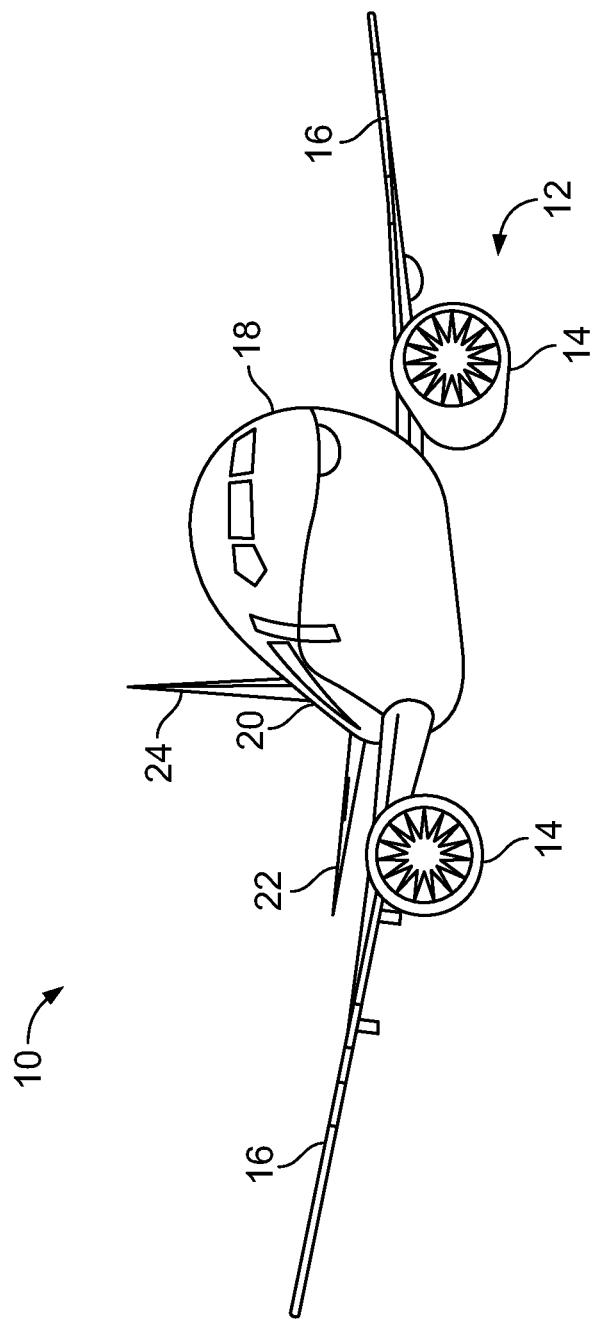
FIG. 1 illustrates a front perspective view of an aircraft, according to an example of the present disclosure.

FIG. 1 illustrates a front perspective view of an aircraft 10, according to an example of the present disclosure. The aircraft 10 includes a propulsion system 12 that can include two turbofan engines 14, for example. Optionally, the propulsion system 12 can include more engines 14 than shown. The engines 14 are carried by wings 16 of the aircraft 10. In other examples, the engines 14 can be carried by a fuselage 18 and/or an empennage 20. The empennage 20 can also support horizontal stabilizers 22 and a vertical stabilizer 24.

The fuselage 18 of the aircraft 10 defines an internal cabin, which can be defined by interior sidewall panels that connect to a ceiling and a floor. The internal cabin can include a flight deck or cockpit, one or more work sections (for example, galleys, personnel carry-on baggage areas, and the like), one or more passenger sections (for example, first class, business class, and economy sections), and/or the like. Overhead stowage bin assemblies can be positioned throughout the internal cabin.

Alternatively, instead of an aircraft, examples of the present disclosure may be used with various other vehicles, such as automobiles, buses, locomotives/train cars, seacraft, spacecraft, and the like. Also, examples of the present disclosure can be used in fixed structures, such as residential and/or commercial buildings.

Figure 2A:
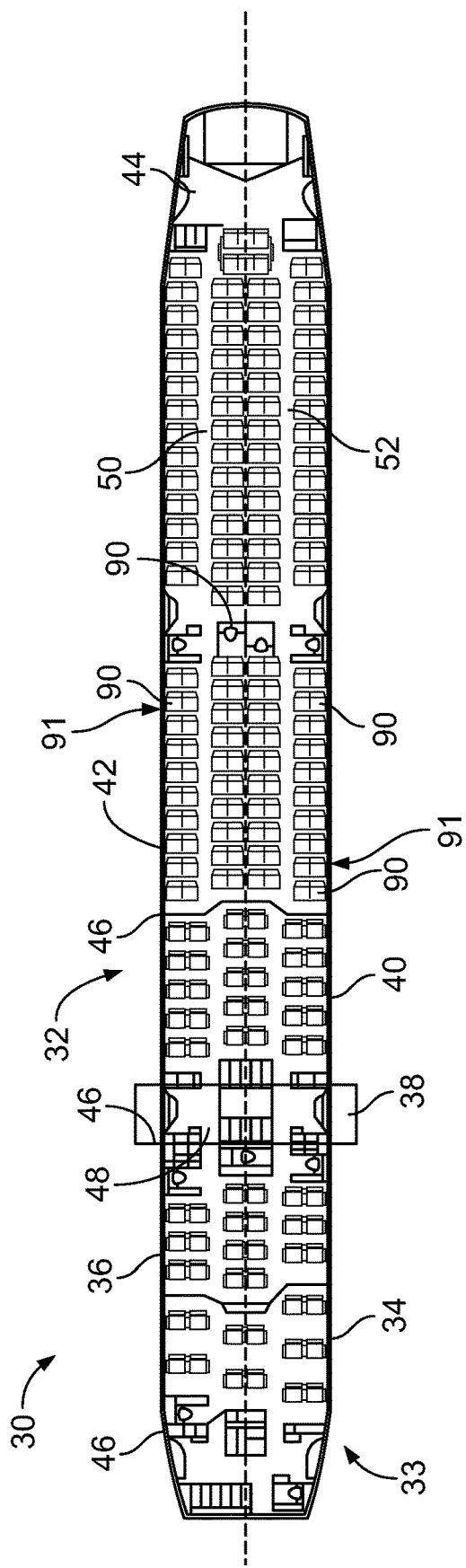
FIG. 2A illustrates a top plan view of an internal cabin of an aircraft, according to an example of the present disclosure.

FIG. 2A illustrates a top plan view of an internal cabin 30 of an aircraft, according to an example of the present disclosure. The internal cabin 30 can be within a fuselage 32 of the aircraft. For example, one or more fuselage walls can define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 can include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 can have fewer or more aisles than shown. For example, the internal cabin 30 can include a single aisle that extends through the center of the internal cabin 30 that leads to the aft section 44. Seat assemblies 90 are positioned throughout the internal cabin 30. The seat assemblies 90 may be arranged in rows 91.

Figure 2B:
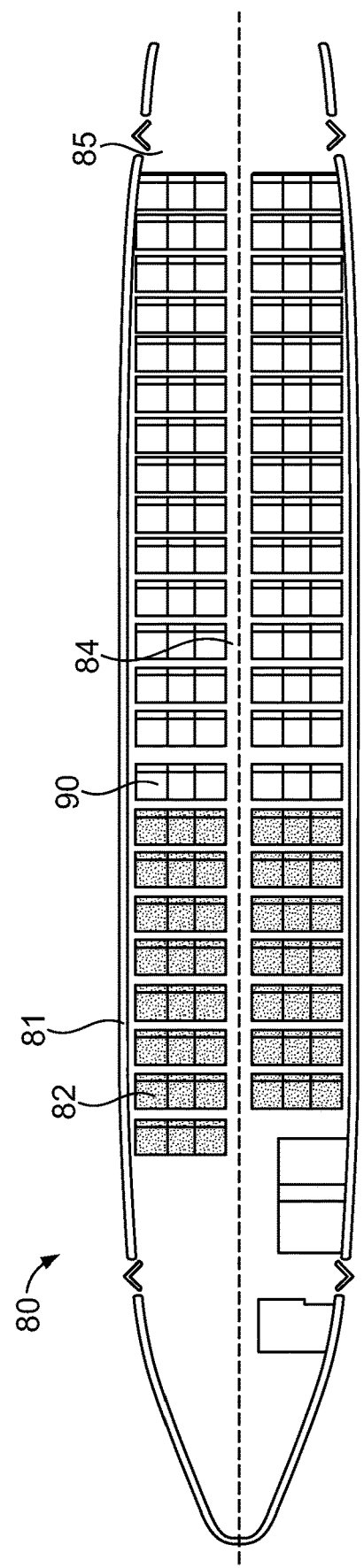
FIG. 2B illustrates a top plan view of an internal cabin of an aircraft, according to an example of the present disclosure.

FIG. 2B illustrates a top plan view of an internal cabin 80 of an aircraft, according to an embodiment of the present disclosure. The internal cabin 80 can be within a fuselage 81 of the aircraft. For example, one or more fuselage walls may define the interior of the internal cabin 80. The internal cabin 80 includes multiple sections, including a main cabin 82 having passenger seat assemblies 90, and an aft section 85 behind the main cabin 82. It is to be understood that the internal cabin 80 may include more or less sections than shown.

The internal cabin 80 can include a single aisle 84 that leads to the aft section 85. The single aisle 84 can extend through the center of the internal cabin 80 that leads to the aft section 85. For example, the single aisle 84 can be coaxially aligned with a central longitudinal plane of the internal cabin 80.

Figure 3:
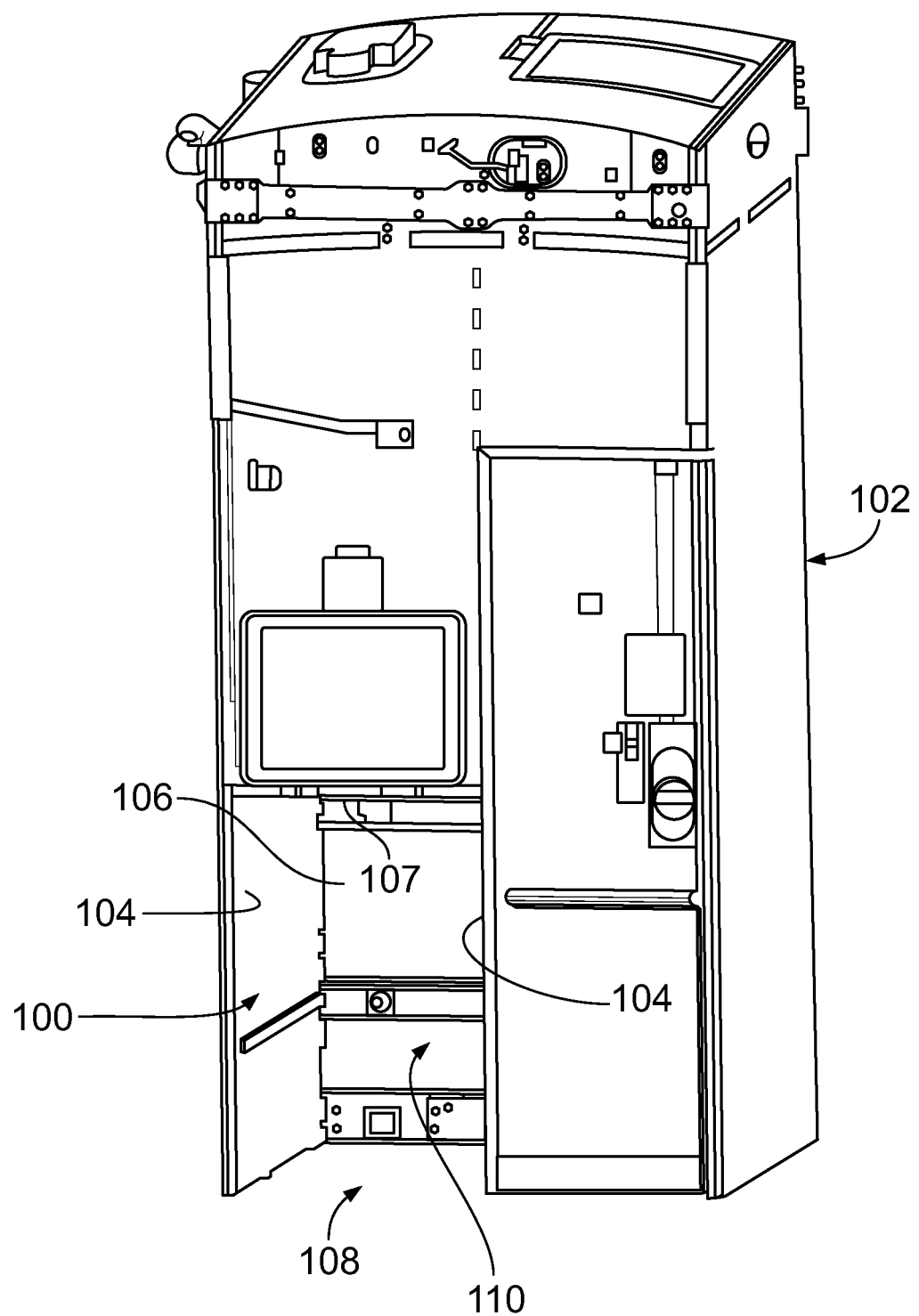
FIG. 3 illustrates a front perspective view of a stowage compartment, according to an example of the present disclosure.

FIG. 3 illustrates a front perspective view of a stowage compartment 100, according to an example of the present disclosure. The stowage compartment 100 is configured to receive and retain one or more galley carts, as described herein. The stowage compartment 100 can be formed within a monument 102, such as a portion of a galley station, a closet, or the like. The stowage compartment 100 is disposed within an internal cabin of a vehicle. For example, the stowage compartment 100 is within the internal cabin 30 of FIG. 2A, or the internal cabin 80 of FIG. 2B. In at least one example, the stowage compartment 100 is within a galley or galley station of a vehicle, such as the galley station 38 shown in FIG. 2A.

The stowage compartment 100 includes lateral walls 104 connected to a rear wall 106, which can be orthogonal to the lateral walls 104, and a top wall 107. The stowage compartment 100 can include an open front 108. Optionally, the stowage compartment 100 can include a moveable front door. An internal chamber 110 is defined between the lateral walls 104, the rear wall 106, and the top wall 107. The open front 108 leads into the internal chamber 110.

Figure 4:
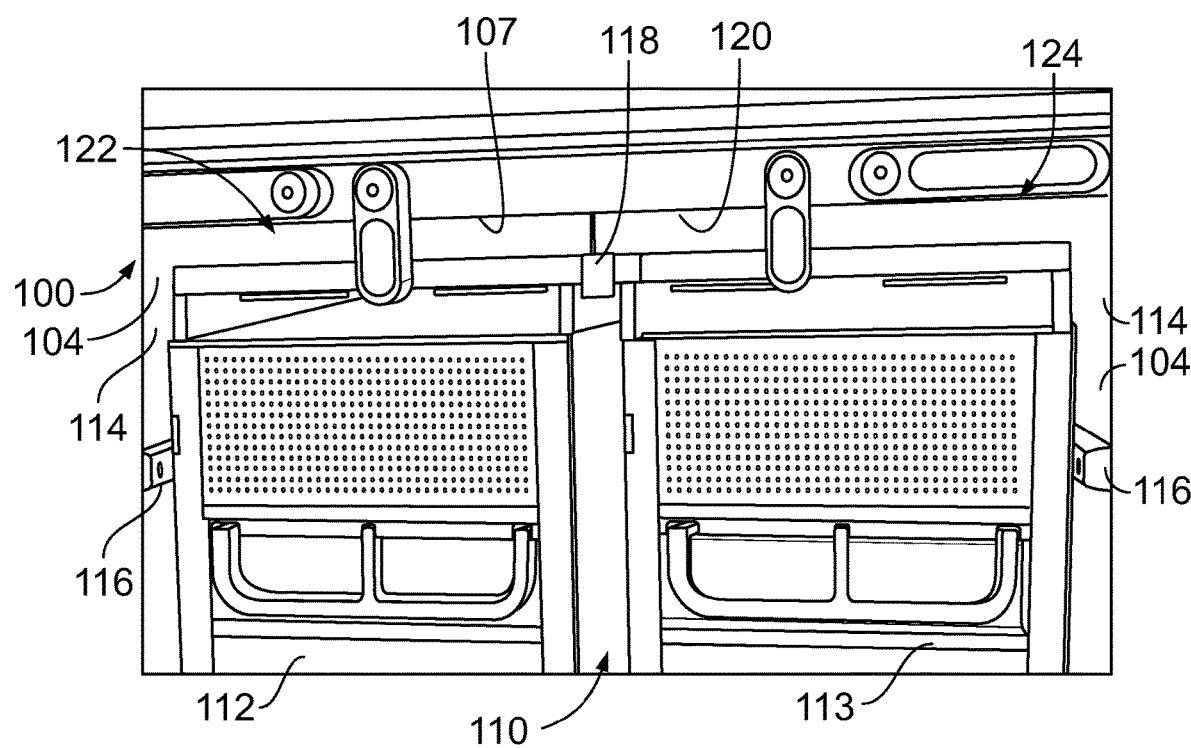
FIG. 4 illustrates a front perspective view of the stowage compartment retaining two galley carts.

FIG. 4 illustrates a front perspective view of the stowage compartment 100 retaining two galley carts 112 and 113. Referring to FIGS. 3 and 4, interior surfaces 114 of the lateral walls 104 can include bumpers 116 that extend toward the rear wall 106. The bumpers 116 are formed of a durable material. For example, the bumpers 116 can be formed of a plastic such as injection molded Nylon. A central divider 118 downwardly extends from an interior surface 120 of the top wall 107. The central divider 118 is configured to divide the stowage compartment 100 into a first retaining area 122 and a second retaining area 124. The first retaining area 122 is configured to retain the galley cart 112, and the second retaining area 124 is configured to retain the galley cart 113.

Figure 5:
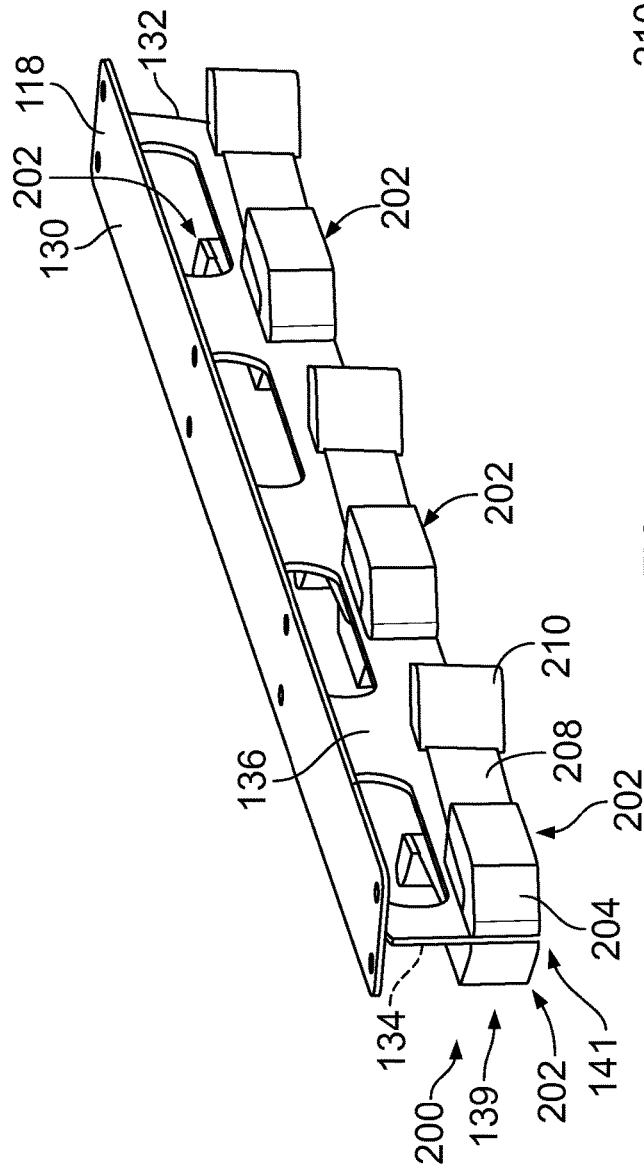
FIG. 5 illustrates a perspective lateral view of a system for securing one or more galley carts within the stowage compartment, according to an example of the present disclosure.

FIG. 5 illustrates a perspective lateral view of a system 200 for securing one or more galley carts (such as the galley carts 112 and 113 shown in FIG. 4) within the stowage compartment 100 (shown in FIGS. 3 and 4), according to an example of the present disclosure. The system 200 includes a plurality of dampers 202. As shown, in at least one example, the system 200 can include six dampers 202. Optionally, the system 200 can include more or fewer dampers 202 than shown. In at least one example, the system 200 can include a single damper 202.

Referring to FIGS. 3-5, in at least one example, the system 200 includes the dampers 202 secured to the central divider 118. The central divider 118 may extend over an entire length of the top wall 107. Optionally, the central divider 118 can extend over less than an entire length of the top wall 107. The central divider 118 includes an upper flange 130 that is configured to be secured to the interior surface 120 of the top wall 107, such as through one more fasteners, adhesives, and/or the like. A central fin 132 downwardly extends from the upper flange 130. The central fin 132 has a first side 134 and an opposite second side 136.

In at least one example, three regularly spaced dampers 202 are secured to the first side 134 of the central fin 132, and three regularly spaced dampers 202 are secured to the second side 136 of the central fin 132. For example, the system 200 includes a first set 139 of three dampers 202 on the first side 134 of the central divider 118, and a second set 141 of three dampers 202 on the second side 136 of the central divider 118. As another example, each side of the central divider 118 can include fewer or more dampers 202 than shown. For example, each of the first side 134 and the second side 136 can include only a single damper 202. In at least one other example, only one of the first side 134 or the second side 136 can include one or more dampers 202. As another example, interior surfaces 114 of the lateral walls 104 can include one or more dampers 202. For example, one or more dampers 202 can be secured to the bumpers 116. The dampers 202 can be secured to one or both of the central divider 118 and/or the lateral walls 104.

Figure 6:
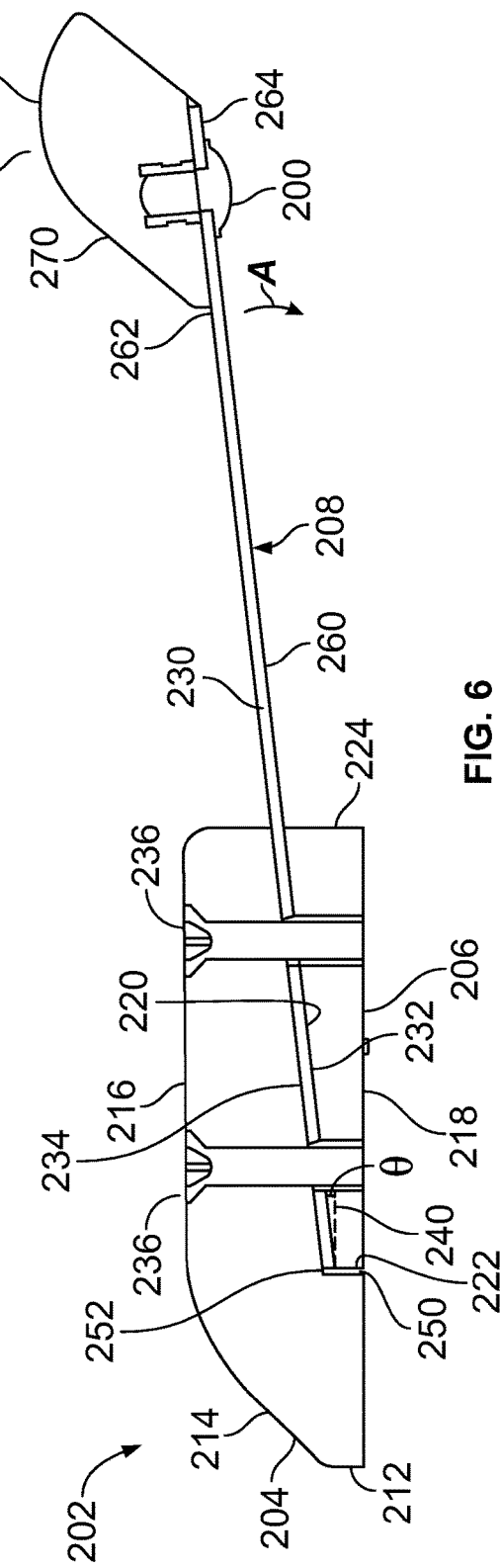
FIG. 6 illustrates a top plan view of a damper, according to an example of the present disclosure.

FIG. 6 illustrates a top plan view of a damper 202, according to an example of the present disclosure. The damper 202 includes a leading contact member 204, a base plate 206, a spring beam 208 coupled to the leading contact member 204 and the base plate 206, and a trailing contact pad 210 coupled to the spring beam 208. The leading contact member 204 can be formed of a durable, low friction material. In at least one example, the leading contact member 204 is formed of a plastic, such as Nylon. The base plate 206 and the trailing contact pad can also be formed of the durable, low friction material.

The leading contact member 204 includes a front tip 212 connected to a rounded or blunted nose 214, which is configured to automatically guide a galley cart into a retaining area within the stowage compartment 100 (shown in FIGS. 3 and 4). The nose 214 connects to a main body 216 that extends toward the trailing contact pad 210.

The base plate 206 includes a flat outer surface 218 that is configured to rest against a surface within the stowage compartment 100. For example, as shown in FIG. 5, the flat outer surface 218 abuts against the first side 134 or the second side 136 of the central divider 118. As another example, the flat outer surface 218 abuts against an interior surface 114 of a lateral wall 104 and/or a bumper 116 of the stowage compartment 100 (as shown in FIG. 4). The base plate 206 also includes an angled interior wall 220. A thickness of the base plate 206 increases from a front end 222 toward a rear end 224, thereby providing the angled interior wall 220.

The spring beam 208 can be formed of stainless steel and provides a spring constant. The spring beam 208 includes a flat, deflectable main body 230. A front portion 232 of the main body 230 is sandwiched between leading contact member 204 and the base plate 206. The angled interior wall 220 of the base plate 206 and a corresponding angled interior wall 234 of the leading contact member 204 sets the spring beam 208 at a desired angular orientation. One or more fasteners 236 compressively sandwich the front portion 232 to the leading contact member 204 and the base plate 206. The fasteners 236 can also be used to secure the damper 202 to a surface within the stowage compartment 100. Optionally, the fasteners 236 may not be used. Instead, the front portion 232 can be secured to the leading contact member 204 and the base plate 206 through one or more adhesives. Further, adhesives can be used to secure the damper 202 to the surface within the stowage compartment 100. In at least one other example, the leading contact member 204 and the base plate 206 are integrally formed as a monolithic structure, and the front portion 232 is embedded therein.

The spring beam 208 is set at an angle $\theta$ in relation to a plane 240 that is parallel to the flat outer surface 218 and/or a surface to which the damper 202 secures. The angle $\theta$ can vary, and is configured to exert a desired spring force constant. For example, in an undeflected state, as shown in FIG. 6, the angle $\theta$ can be between 5-20 degrees. Optionally, the angle $\theta$ can be less than 5 degrees, or greater than 20 degrees.

As shown, the spring beam 208 can also include a front hook 250 extending from a front tip 252 of the main body 230. The front hook 250 is inwardly canted in relation to the main body 230 and anchors the spring beam 208 to the leading contact member 204 and the base plate 206. Optionally, the spring beam 208 may not include the front hook 250.

The front portion 232 of the main body 230 sandwiched between the leading contact member 204 and the base plate 206 is less than half a length of the main body 230. For example, the front portion 232 can be a third or less the length of the main body 230. The main body 230 includes an exposed intermediate portion 260 rearwardly extending from the front portion 232.

The trailing contact pad 210 outwardly extends from a surface 262 of the main body 230. The trailing contact pad 210 is secured to a rear end 264 of the main body 230. As shown, the trailing contact pad 210 extends from the surface 262 away from a surface of stowage compartment 100 to which the damper 202 secures. The trailing contact pad 210 secures to the rear end 264 through one or more fasteners 266. Optionally, the trailing contact pad 210 can secure to the rear end 264 through one or more adhesives along with the fastener 266, or in place of the fastener 266.

The trailing contact pad 210 includes a rearwardly angled front face 270 and a rounded lateral contact surface 272 rearwardly extending from the front face 270. The rearwardly angled front face 270 and the rounded lateral contact face 272 are configured to guide a galley cart away from the spring beam 208 as the galley cart is moved into and out of the stowage compartment 100.

Alternatively, the spring beam 208 can be fully embedded in a durable, low friction material. For example, the spring beam 208 can be fully encased within a plastic, such as Nylon, and not include an exposed portion, such as the exposed intermediate portion 260. However, the exposed intermediate portion 260 is less susceptible to fatigue that can occur over time through creep and permanent setting of a covering plastic. The exposed intermediate portion 260 maintains a given spring force constant for a given deflection over time.

Referring to FIGS. 3-6, as the galley carts 112 and 113 are moved into the first retaining area 122 and the second retaining area 124, respectively, the leading contact member 204 of at least one damper 202 guides the galley carts 112 and 113 therein, by virtue of the blunted nose 214. As the galley carts 112 and 113 continue to be moved into the respective retaining areas 122 and 124, a side wall of each galley cart 112 and 113 slides along the leading contact member 204. With continued urging, the side wall contacts the trailing contact pad 210 without contacting the exposed intermediate portion 260 of the spring beam 208. In at least one example, the leading contact member 204 can be sized and shaped so that the galley carts 112 and 113 do not contact the exposed intermediate portion 260 when the galley carts 112 and 113 are moved into and out of the respective retaining areas 122 and 124.

When the galley carts 112 and 113 are disposed within the respective retaining areas 122 and 14, a lateral surface of each contacts the leading contact member 204 and the trailing contact pad 210. In this manner, the spring beam 208 deflects toward a surface of the stowage compartment 100 to which the damper 202 is secured (such as the first side 134 of the second side 136 of the central divider 118), and exerts a corresponding spring force into a galley cart 112 or 113 through the trailing contact pad 210. The spring force exerted by the spring beam 208 forces the galley cart 112 or 113 into another surface of the stowage compartment 100, such as an interior surface 114 of a lateral wall 104, thereby securing and stabilizing the galley cart 112 or 113 (for example, laterally stabilizing to prevent rattling) within the stowage chamber 100. Because the galley cart 112 or 113 is then secured and stabilized via the spring force of the deflected spring beam 208, there is little to no clearance space between the galley cart 112 or 113 and interior surfaces of the stowage compartment that could otherwise allow for movement of the galley cart 112 or 113 therein. As such, the potential for noise generated by the galley cart 112 or 113 within the stowage compartment 100 (such as rattling) is eliminated, minimized, or otherwise reduced.

Figure 7:
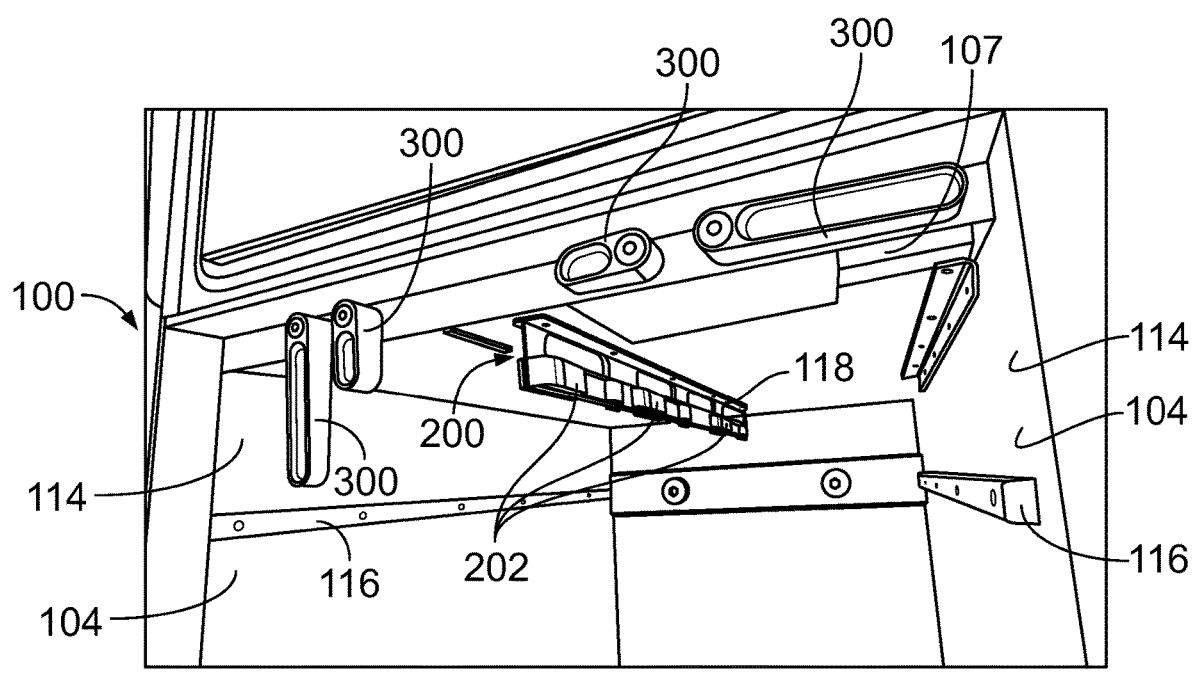
FIG. 7 illustrates an internal perspective view of a stowage compartment including the system for securing one or more galley carts, according to an example of the present disclosure.

FIG. 7 illustrates an internal perspective view of the stowage compartment 100 including the system 200 for securing one or more galley carts, according to an example of the present disclosure. As shown, the system 200 includes the dampers 202 secured to the central divider 118 that secures to the top wall 107. In at least one other example, the system 200 can include one or more dampers 202 secured to one or both of the lateral walls 104 instead of the central divider 118. In at least one other example, the system 200 can include one or more dampers secured to one or both of the lateral wall 104 and one or both sides of the central divider 118. In general, the system 200 includes one or more dampers 202 configured to be secured to one or more surfaces of the stowage compartment 100. The one or more surfaces include the first side 134 and/or the second side 136 of the central divider 118, one or both of the interior surfaces 114 of the lateral wall 104, and/or the like.

As shown, the stowage compartment 100 can also include pivotal front stops 300. The front stops 300 are disposed at a front of the stowage compartment 100, and are configured to be selectively pivoted between open positions, in which they do not extend over a portion of the front 108, and closed positions, in which they extend over a portion of the front 108. In the closed positions, the front stops 300 prevent galley carts within the stowage compartment from passing out of the front 108 of the stowage compartment 100. Optionally, the stowage compartment 100 may not include the front stops 300.

As shown in FIG. 3-7, by positioning one or more dampers 202 on each side 134 and 136 of the central divider 118, the system 200 is able to exert securing and stabilizing forces into each of the galley carts 112 and 113 toward the hard surfaces of the lateral walls 104. In this manner, the system 200 reduces the potential of noise generated by the galley carts 112 within the stowage compartment 100. Further, it has been found that three dampers 202 on each of the sides 134 and 136 provides reliable and redundant securing and stabilizing force in relation to the galley carts 112 within the stowage compartment 100.

As described herein, examples of the present disclosure provide the system 200 for securing and stabilizing one or more galley carts 112 and/or 113 within the stowage compartment 100 within an internal cabin of a vehicle (such as the internal cabin 30 shown in FIG. 2A or the internal cabin 80 shown in FIG. 2B). The system 200 includes one or more dampers 202 configured to be secured to one or more surfaces (such as the first surface 134, the second surface 136, and/or an interior surface 114) of the stowage compartment 100. The one or more dampers 202 are configured to exert a spring force into the one or more galley carts 112 and/or 113 to stabilize the one or more galley carts 112 and/or 113 between the one or more dampers 202 and one or more other surfaces (such as the interior surface 114 when the dampers 202 are disposed on the first surface 134 and/or the second surface 136) of the stowage compartment 100.

In at least one example, a method for securing and stabilizing one or more galley carts 112 and/or 113 within the stowage compartment 100 within an internal cabin of a vehicle, includes securing one or more dampers 202 to one or more surfaces of the stowage compartment 100. The one or more dampers 202 are configured to exert a spring force into the one or more galley carts 112 and/or 113 to stabilize the one or more galley carts 112 and/or 113 between the one or more dampers 202 and one or more other surfaces of the stowage compartment 100. In at least one example, said securing includes securing the one or more dampers 202 to a central divider 118 that is secured to a top wall 107 of the stowage compartment 100.

Further, the disclosure comprises examples according to the following clauses:

Clause 1. A system for securing and stabilizing one or more galley carts within a stowage compartment within an internal cabin of a vehicle, the system comprising:
one or more dampers configured to be secured to one or more surfaces of the stowage compartment, wherein the one or more dampers are configured to exert a spring force into the one or more galley carts to stabilize the one or more galley carts between the one or more dampers and one or more other surfaces of the stowage compartment.

Clause 2. The system of Clause 1, wherein the one or more dampers are secured to a central divider configured to be secured to a top wall of the stowage compartment.

Clause 3. The system of Clause 2, wherein the one or more dampers comprise:
a first damper on a first side of the central divider; and
a second damper on a second side of the central divider.

Clause 4. The system of Clause 2, wherein the one or more dampers comprise:
a first set of three dampers on a first side of the central divider; and
a second set of three dampers on a second side of the central divider.

Clause 5. The system of any of Clauses 1-4, wherein the one or more dampers comprise:
a leading contact member;
a spring beam coupled to the leading contact member; and
a trailing contact pad coupled to the spring beam.

Clause 6. The system of Clause 5, wherein the leading contact member includes a blunted nose configured to automatically guide the one or more galley carts into the stowage compartment.

Clause 7. The system of Clauses 5 or 6, wherein the spring beam includes a flat deflectable main body.

Clause 8. The system of any of Clauses 5-7, wherein the spring beam is formed of stainless steel.

Clause 9. The system of any of Clauses 5-8, wherein the spring beam comprises:
a front portion secured to the leading contact member;
an exposed intermediate portion rearwardly extending from the front portion; and
a rear end secured to the trailing contact pad.

Clause 10. The system of any of Clauses 5-9 5, wherein the trailing contact pad comprises:
a rearwardly angled front face; and
a rounded lateral contact surface rearwardly extending from the rearwardly angled front face.

Clause 11. A method for securing and stabilizing one or more galley carts within a stowage compartment within an internal cabin of a vehicle, the method comprising:
securing one or more dampers to one or more surfaces of the stowage compartment, wherein the one or more dampers are configured to exert a spring force into the one or more galley carts to stabilize the one or more galley carts between the one or more dampers and one or more other surfaces of the stowage compartment.

Clause 12. The method of Clause 11, wherein said securing comprises securing the one or more dampers to a central divider that is secured to a top wall of the stowage compartment.

Clause 13. The method of Clauses 11 or 12, wherein the one or more dampers comprise:
a leading contact member;
a spring beam coupled to the leading contact member; and
a trailing contact pad coupled to the spring beam.

Clause 14. A vehicle comprising:
an internal cabin;
a stowage compartment within the internal cabin, wherein the stowage compartment is configured to retain one or more galley carts; and
a system for securing and stabilizing the one or more galley carts within the stowage compartment, the system comprising:
one or more dampers configured to be secured to one or more surfaces of the stowage compartment, wherein the one or more dampers are configured to exert a spring force into the one or more galley carts to stabilize the one or more galley carts between the one or more dampers and one or more other surfaces of the stowage compartment.

Clause 15. The vehicle of Clause 14, wherein the one or more dampers are secured to a central divider that is secured to a top wall of the stowage compartment.

Clause 16. The vehicle of Clause 15, wherein the one or more dampers comprise:
a first damper on a first side of the central divider; and
a second damper on a second side of the central divider.

Clause 17. The vehicle of Clause 15, wherein the one or more dampers comprise:
a first set of three dampers on a first side of the central divider; and
a second set of three dampers on a second side of the central divider.

Clause 18. The vehicle of any of Clauses 14-17, wherein the one or more dampers comprise:
a leading contact member including a blunted nose configured to automatically guide the one or more galley carts into the stowage compartment;
a spring beam coupled to the leading contact member, wherein the spring beam includes a flat deflectable main body; and
a trailing contact pad coupled to the spring beam, wherein the trailing contact pad includes a rearwardly angled front face, and a rounded lateral contact surface rearwardly extending from the rearwardly angled front face.

Clause 19. The vehicle of Clause 18, wherein the spring beam is formed of stainless steel.

Clause 20. The vehicle of Clauses 18 or 19, wherein the spring beam further comprises:
a front portion secured to the leading contact member;
an exposed intermediate portion rearwardly extending from the front portion; and
a rear end secured to the trailing contact pad.

As described herein, examples of the present disclosure provide systems and methods for securing a galley cart within a compartment within an internal cabin of a vehicle, such as a commercial aircraft. Further, examples of the present disclosure provide systems and methods that eliminate, minimize, or otherwise reduce a potential of noise generated by a galley cart within a compartment.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for securing and stabilizing one or more galley carts within a stowage compartment within an internal cabin of a vehicle, the system comprising: one or more dampers securable to one or more surfaces of the stowage compartment, wherein the one or more dampers are configured to exert a spring force into the one or more galley carts to stabilize the one or more galley carts between the one or more dampers and one or more other surfaces of the stowage compartment, wherein the one or more dampers are secured to a central divider configured to downwardly extend from an interior surface of a top wall of the stowage compartment; wherein the one or more dampers comprise: a leading contact member, wherein the leading contact member is formed of a durable, low friction material, wherein the leading contact member includes a front tip connected to a blunted nose; a base plate, wherein the base plate is formed of the durable, low friction material, wherein the base plate includes a flat outer surface and an angled interior wall; a spring beam coupled to the leading contact member and the base plate, wherein the spring beam provides a spring constant, and wherein the spring beam includes a flat, deflectable main body, and wherein a front portion of the main body is sandwiched between the leading contact member and the base plate; and a trailing contact pad coupled to the spring beam, wherein the trailing contact pad is formed of the durable, low friction material, wherein the trailing contact pad outwardly extends from a rear end of the flat, deflectable main body, and wherein the trailing contact pad includes a rearwardly angled front face and a rounded lateral contact surface rearwardly extending from the rearwardly angled front face.

2. The system of claim 1, wherein the one or more dampers comprise: a first damper on a first side of the central divider; and a second damper on a second side of the central divider.

3. The system of claim 1, wherein the one or more dampers comprise: a first set of three dampers on a first side of the central divider; and a second set of three dampers on a second side of the central divider.

4. The system of claim 1, wherein the one or more dampers comprise: a leading contact member; a spring beam coupled to the leading contact member; and a trailing contact pad coupled to the spring beam.

5. The system of claim 4, wherein the leading contact member includes a blunted nose configured to automatically guide the one or more galley carts into the stowage compartment.

6. The system of claim 4, wherein the spring beam includes a flat deflectable main body.

7. The system of claim 4, wherein the spring beam is formed of stainless steel.

8. The system of claim 4, wherein the spring beam comprises: a front portion secured to the leading contact member; an exposed intermediate portion rearwardly extending from the front portion; and a rear end secured to the trailing contact pad.

9. The system of claim 4, wherein the trailing contact pad comprises: a rearwardly angled front face; and a rounded lateral contact surface rearwardly extending from the rearwardly angled front face.

10. A method for securing and stabilizing one or more galley carts within a stowage compartment within an internal cabin of a vehicle, the method comprising: securing one or more dampers to a central divider downwardly extending from an interior surface of a top wall of the stowage compartment, wherein the one or more dampers are configured to exert a spring force into the one or more galley carts to stabilize the one or more galley carts between the one or more dampers and one or more other surfaces of the stowage compartment; wherein the one or more dampers comprise: a leading contact member, wherein the leading contact member is formed of a durable, low friction material, wherein the leading contact member includes a front tip connected to a blunted nose; a base plate, wherein the base plate is formed of the durable, low friction material, wherein the base plate includes a flat outer surface and an angled interior wall; a spring beam coupled to the leading contact member and the base plate, wherein the spring beam provides a spring constant, and wherein the spring beam includes a flat, deflectable main body, and wherein a front portion of the main body is sandwiched between the leading contact member and the base plate; and a trailing contact pad coupled to the spring beam, wherein the trailing contact pad is formed of the durable, low friction material, wherein the trailing contact pad outwardly extends from a rear end of the flat, deflectable main body, and wherein the trailing contact pad includes a rearwardly angled front face and a rounded lateral contact surface rearwardly extending from the rearwardly angled front face.

11. The method of claim 10, wherein the one or more dampers comprise: a leading contact member; a spring beam coupled to the leading contact member; and a trailing contact pad coupled to the spring beam.

12. A vehicle comprising: an internal cabin; a stowage compartment within the internal cabin, wherein the stowage compartment is configured to retain one or more galley carts; a central divider downwardly extending from an interior surface of a top wall of the stowage compart and a system for securing and stabilizing the one or more galley carts within the stowage compartment, the system comprising: one or more dampers secured to the central divider of the stowage compartment, wherein the one or more dampers are configured to exert a spring force into the one or more galley carts to stabilize the one or more galley carts between the one or more dampers and one or more other surfaces of the stowage compartment; wherein the one or more dampers comprise: a leading contact member, wherein the leading contact member is formed of a durable, low friction material, wherein the leading contact member includes a front tip connected to a blunted nose; a base plate, wherein the base plate is formed of the durable, low friction material, wherein the base plate includes a flat outer surface and an angled interior wall; a spring beam coupled to the leading contact member and the base plate, wherein the spring beam provides a spring constant, and wherein the spring beam includes a flat, deflectable main body, and wherein a front portion of the main body is sandwiched between the leading contact member and the base plate; and a trailing contact pad coupled to the spring beam, wherein the trailing contact pad is formed of the durable, low friction material, wherein the trailing contact pad outwardly extends from a rear end of the flat, deflectable main body, and wherein the trailing contact pad includes a rearwardly angled front face and a rounded lateral contact surface rearwardly extending from the rearwardly angled front face.

13. The vehicle of claim 12, wherein the one or more dampers comprise: a first damper on a first side of the central divider; and Page 5 a second damper on a second side of the central divider.

14. The vehicle of claim 12, wherein the one or more dampers comprise: a first set of three dampers on a first side of the central divider; and a second set of three dampers on a second side of the central divider.

15. The vehicle of claim 12, wherein the one or more dampers comprise: a leading contact member including a blunted nose configured to automatically guide the one or more galley carts into the stowage compartment; a spring beam coupled to the leading contact member, wherein the spring beam includes a flat deflectable main body; and a trailing contact pad coupled to the spring beam, wherein the trailing contact pad includes a rearwardly angled front face, and a rounded lateral contact surface rearwardly extending from the rearwardly angled front face.

16. The vehicle of claim 15, wherein the spring beam is formed of stainless steel.

17. The vehicle of claim 15, wherein the spring beam further comprises: a front portion secured to the leading contact member; an exposed intermediate portion rearwardly extending from the front portion; and a rear end secured to the trailing contact pad.

* * * * *